(12) United States Patent
Inoue et al.

(10) Patent No.: US 6,677,732 B1
(45) Date of Patent: Jan. 13, 2004

(54) CHARGE AND/OR DISCHARGE CIRCUIT, AND CARRIER DETECTOR CIRCUIT USING SAME

(75) Inventors: Takahiro Inoue, Nara (JP); Naruichi Yokogawa, Kashihara (JP); Takeshi Nishino, Nara (JP)

(73) Assignee: Sharp Kabushiki Kaisha, Osaka (JP)

(*) Notice: Subject to any disclaimer, the term of this patent is extended or adjusted under 35 U.S.C. 154(b) by 0 days.

(21) Appl. No.: 10/189,396

(22) Filed: Jul. 8, 2002

(30) Foreign Application Priority Data

Jul. 11, 2001 (JP) ......................................... 2001-211288

(51) Int. Cl.[7] ............................................. H01M 10/46
(52) U.S. Cl. ..................................................... 320/166
(58) Field of Search .............................. 320/166, 156, 320/158, 159; 323/315

(56) References Cited

U.S. PATENT DOCUMENTS 5,384,570 A * 1/1995 Dedic
5,917,349 A * 6/1999 Nguyen
2002/0098818 A1 7/2002 Yokogawa et al.

FOREIGN PATENT DOCUMENTS

JP 5-242271 9/1993

* cited by examiner

Primary Examiner—Edward H. Tso
(74) Attorney, Agent, or Firm—Birch, Stewart, Kolasch & Birch, LLP

(57) ABSTRACT

A charge/discharge circuit creates a carrier detection level based on a received signal in a carrier detector circuit for detecting the presence or absence of a carrier in such applications as a receiver for an IR remote controller. The charge/discharge circuit operates to amplify a current, that is produced in n-type transistors QN1, QN2, QN3 and a reference current source, in a p-type transistor QP1. The amplified current is mirrored by a current mirror circuit to be supplied as an emitter current of a p-type transistor QP2. The charge/discharge circuit charges a capacitor with a small current, i.e., a base current of the p-type transistor QP2. The charge/discharge circuit includes a bias voltage source which produces such a bias voltage that the emitter-collector voltage of the p-type transistor QP1 becomes substantially equal to the emitter-collector voltage of the p-type transistor QP2. As a result, it is possible to limit an error of a charge current charged into the capacitor, which is caused by the emitter-collector voltage dependent change of the collector current and thus the base current, known as the Early effect.

8 Claims, 8 Drawing Sheets

CHARGE/DISCHARGE CIRCUIT 41

CHARGE AND/OR DISCHARGE CIRCUIT, AND CARRIER DETECTOR CIRCUIT USING SAME

FIELD OF THE INVENTION

The present invention relates to circuits for charging and/or discharging a capacitor with a constant current, such as a charge/discharge circuit that produces a carrier detection level, for use in receivers for IR remote controllers or in demodulators for demodulating a carrier signal and the like. The invention also relates to carrier detector circuits using such circuits.

BACKGROUND OF THE INVENTION

Miniaturization of receivers for IR remote controllers has advanced to the degree where it is now possible to realize a receiver in a two-chip configuration, in which an external photodiode is connected to an IC chip. This down-sizing of the receiver has forced the capacitor, which is charged or discharged according to the presence or absence of a detected carrier to output a voltage of a carrier detection level, to have a significantly less capacity, so as to fit the size of the IC chip. Thus, there is a present need to accurately maintain a small charge/discharge current.

FIG. 5 is a block diagram showing an example of a structure of a receiver 1 for an IR remote controller. FIG. 6(a) through FIG. 6(e) are diagrams respectively showing waveforms from various parts of the receiver 1. The receiver 1 operates to convert an IR transmitted code signal into a photocurrent signal Iin, as shown in FIG. 6(a), through a photodiode 2. The photocurrent signal Iin enters a receiver chip 3, which is realized by an integrated circuit, and is demodulated therein to an output signal RXOUT as shown in FIG. 6(e). The receiver 1 outputs the output signal RXOUT to various devices, such as a microcomputer that controls electrical devices. The IR signal is an ASK (Amplitude Shift Keying) signal that has been modulated by a predetermined carrier of around 30 kHz to 60 kHz.

In the receiver chip 3, the photocurrent signal Iin, shown in FIG. 6(a), is successively amplified through a first-stage amplifier (HA) 4, a second-stage amplifier (2nd AMP) 5, and a third-stage amplifier (3rd AMP) 6. A band-pass filter (BPF) 7, designated by the carrier frequency, extracts a carrier component, as shown by α1 in FIG. 6(b), from the amplified photocurrent signal Iin. A detector circuit 8 of the following stage detects the carrier component by a carrier detection level Det as shown by α2 in FIG. 6(b), and an integrating circuit 9 performs calculations of integration with respect to the carrier time, as shown by α11 in FIG. 6(d). A hysterisis comparator 10 compares an integral Int, which is the output of the integrating circuit 9, with a predetermined threshold level as shown by α12 in FIG. 6(d), so as to decide whether or not the carrier is present. The hysterisis comparator 10 then outputs the result of judgment as the output signal RXOUT shown in FIG. 6(e).

On the output side of the first-stage amplifier 4 is provided a low-pass filter 11 which detects a DC level of the photocurrent from a fluorescent lamp or the sunlight. The second-stage amplifier 5 of the following stage removes the DC level directly from the output of the first-stage amplifier 4, so as to eliminate the influence of light from the fluorescent lamp or the sunlight. There is also provided an ABCC (Auto Bias Current Control) circuit 12 in connection with the first-stage amplifier 4. The ABCC circuit 12 controls a DC bias of the first-stage amplifier 4 according to the output of the low-pass filter 11. There is also provided an of trimming circuit 13 in connection with the band-pass filer 7. The trimming circuit 13 operates to trim zener diodes (not shown), which are provided between terminals TRM1 through TRM5 extending from the junctions of resistance dividers (not shown), so as to adjust a center frequency of of the band-pass filer 7.

FIG. 7 is an equivalent circuit diagram of the detector circuit 8 and the integrating circuit 9. The detector circuit 8 and the integrating circuit 9, together with the hysterisis comparator 10, make up a carrier detector circuit. The detector circuit 8 generates carrier detection level Det from the output Sig of the band-pass filter 7. The integrating circuit 9 compares the output Sig with the carrier detection level Det, so as to perform calculations of integration on the result of comparison.

The detector circuit 8 is realized by a detector 21 and a charge/discharge circuit 22. The detector 21 detects groups of pulses of a target carrier frequency, as shown by α21 in FIG. 6(c). The charge/discharge circuit 22 compares the output Vc1 of the detector 21 with a reference voltage V1, so as to perform calculations of integration in Time ton, in which pulse groups are present, and in Time toff, in which the pulse groups are absent, which are decided according to the result of comparison. That is, the charge/discharge circuit 22 charges or discharges the capacitor (not shown) installed in the device, so as to find a carrier detection level Det that is in accordance with the input signal.

Therefore, the carrier detection level satisfies the following condition $$ton \times Ij = toff \times If \tag{1}$$

where Ij is the charge current and If is the discharge current.

Time ton and Time toff vary according to the carrier detection level. With increase in carrier detection level Det, Time ton becomes shorter and Time Toff becomes longer. That is, the carrier detection level is the level that satisfies Equation (1), i.e., the level at which the amount of stored charge and the amount of released charge are equal to each other. For example, when the charge current is equal to the discharge current, i.e., when Ij≈If, then ton≈toff from Equation (1), under which condition transmitted signals with up to 50% carrier can be received. Above 50%, the amount of stored charge becomes large and the carrier detection level Det is increased, with the result that the reception sensitivity becomes poor. Thus, signals whose carrier proportion exceeds 50% are regarded as noise, and the carrier is separated from the noise. The noise carrier of an inverter fluorescent lamp, which oscillates continuously, is close to 100%.

Meanwhile, the proportion of Time ton in a transmitted signal is called the duty ratio, which is expressed by the following Equation (2)

$$duty = ton/(ton + toff) = 1/(1 + Ij/If) \tag{2}$$

The transmitted signal (code) of an IR remote controller differs from one manufacturer to another, and a wide range of duty ratio, from 10% to 60%, is employed. In order to receive a transmitted signal with a high duty ratio, reception sensitivity needs to be maintained by limiting the increase of the carrier detection level Det by reducing the charge current Ij. However, this setting for receiving a high-duty-ratio signal also limits the increase of the carrier detection level for the noise carrier of the inverter fluorescent lamp, which makes it difficult to separate the carrier from the noise and may cause reception failure or malfunction. Further, in integrated circuits (ICs), the currents Ij and If need to take into account such factors as non-uniformity in process parameters or fluctuation of surrounding temperature, which need to be taken into consideration by the receivable duty ratio to satisfy the specification range of the duty ratio.

FIG. 8 shows a charge/discharge circuit 31, which is a typical conventional example of the charge/discharge circuit 22. The charge/discharge circuit 31 is realized by a capacitor c2, a comparator 32 of a small output current, and a buffer circuit 33 of a small input current. The configuration of FIG. 8 is adapted so that the comparator 32 receives an inverted output $Vc1^{-1}$ of a detector 21, as shown in FIG. 6(c), instead of directly receiving the output Vc1 of the detector 21.

In the comparator 32, the bases of transistors qn1 and qn2, which make up a transistor pair, receive the inverted output $Vc1^{-1}$ and a reference voltage V1 from a reference voltage source 34, respectively. The emitters of the transistors qn1 and qn2 are grounded via a constant current source f1. The collector of the transistor qn1 is connected to a high-level power supply Vcc, and the collector of the transistor qn2 is connected to the high-level power source Vcc via a transistor qn3. The constant current source f1 draws a constant current Ij0 from the emitter of the transistor pair qn1 and qn2, so that a current, corresponding to a difference of the inverted output $Vc1^{-1}$ and the reference voltage V1 is drawn from the base of the transistor qn3. The emitter current of the transistor qp1 is created based on a base current Ij1 of the transistor qn3. The emitter current of the transistor qp1 is mirrored by transistors qp3 and qp4, which make up a current mirror circuit, to be supplied as the emitter current of a transistor qp2. The transistor qp2 creates a base current based on this emitter current, so as to output the base current as the charge current Ij to the capacitor c2.

In the buffer circuit 33, a biased current, which is a discharge current If from the capacitor c2, is fed to the base of an input transistor qn4. The emitter of the transistor qn4, together with the emitter of a transistor qn5 which is paired with the transistor qn4, is grounded via a constant current source f2. The collectors of the transistors qn4 and qn5 are respectively connected to the power supply Vcc via transistors qp5 and qp6 of equal area making up a current mirror circuit. Between the base of the transistor qn5 and the power supply Vcc is interposed a transistor qn6. The base of the transistor qn6 is connected between the collector of the transistor qn5 and the collector of the transistor qp6. The carrier detection level Det is outputted from the base of the transistor qn5 and from the emitter of the transistor qn6. The base of the transistor qn5 is connected to a constant current source f3 for drawing a constant current.

According to this configuration, in the presence of a carrier input, the inverted output $Vc1^{-1}$ of the detector 21 is at low level and the capacitor c2 is charged with the charge current Ij. In the absence of a carrier input, the inverted current $Vc1^{-1}$ is at high level and the capacitor c2 is discharged with a discharge current If. The charge current Ij and the discharge current If, which are small currents, are obtained by utilizing the base currents of the transistors qp2 and qn4, so as to realize a long time constant and therefore ensure a sufficient capacity for the capacitor c2 to be installed in the receiver chip 3.

In the charge/discharge circuit 31, ideally, the current produced by the constant current source f1 and the transistors qn1 and qn2, which is drawn as the base current Ij1 of the transistor qn3, should be equal to the charge current Ij. However, this causes an error due to the Early effect of the transistors qp1 and qp2. The Early effect is the dependence of the collector current Ic of the transistor on the collector-emitter voltage Vce of the transistor, and it is generally given as $$Ic = Is(1 + Vce/Va)\exp(Vbe/Vt) \quad (3),$$

where Is is the saturation current, Va is the early voltage, Vt=kT/q (k: Boltzmann constant, T: absolute temperature, q: elementary charge).

Thus, Vce(qp1) and Vce(qp2), which are collector-emitter voltages of the transistors qp1 and qp2, respectively, can be expressed as $$Vce(qp1) = Vcc - Vbe(qp3) \quad (4)$$

$$Vce(qp2) = Vc2 + Vbe(qp2) \quad (5),$$

where Vc2 is the charge voltage of the capacitor c2.

This means that the temperature dependence of the collector-emitter voltage Vce(qp1) of the transistor qp1 is positive (temperature dependence of Vbe is typically −2 mV/° C.), and that of the collector-emitter voltage Vce(qp2) of the transistor qp2 is negative. Hence, an error between the currents Ij1 and Ij is increased according to the temperature dependence of 2Vbe. Further, the charge voltage Vc2 of the capacitor c2 is decided and varied according to the carrier detection level Det.

Therefore, Vce(qp1)≠Vce(qp2), and it can be seen from this how the Early effect causes an error. It is therefore required to take into account the Early effect and set a high duty ratio to attain receivable duty that satisfies the specifications of the circuit. This, however, brings about difficulty in separating the carrier from the noise in the inverter fluorescent lamp and may cause reception failure or malfunction.

From Equation (2), the receivable duty ratio is decided by the charge current-to-discharge current ratio Ij/If. The charge current Ij and discharge current If are given respectively as follows.

$$Ij = Ij0/\beta(qn3) - If0/2\beta(qn4) \quad (6)$$

$$If = If0/2\beta(qn4) \quad (7),$$

where β is the current amplification rate of the transistor, which varies as a function of a collector current value.

Thus, in order to equalize the current amplification rates β, the transistors need to have the same collector currents. In the charge/discharge circuit 31 of FIG. 8, the number of transistors qn3(m):qn4(n)=1:1. When the receivable duty ratio is 50% and when Ij0=If0 in Equations (6) and (7), the collector current of the transistor qn4 is half the collector current of the transistor qn3, i.e., β(qn3)≠β(qn4). As a result, a small error is caused on the charge current-to-discharge current ratio.

SUMMARY OF THE INVENTION

An object of the present invention is to provide a charge/discharge circuit that is capable of accurately producing a charge current and/or a discharge current, and to provide a carrier detector circuit that uses such a charge/discharge circuit.

In order to achieve this object, a charge circuit of the present invention, which is a charge circuit for charging a capacitor with a base current of a p-type transistor, includes: reference current producing means for producing a reference current for charging the capacitor; a current mirror circuit which mirrors the reference current so as to supply the reference current as an emitter current of the p-type transistor; and a bias voltage source which produces such a bias voltage that an emitter-collector voltage of an output-stage transistor which draws the reference current from the current mirror circuit in the reference current producing means becomes substantially equal to an emitter-collector voltage of the p-type transistor.

According to this configuration, the charge circuit which charges the capacitor with a small current using the base current of the p-type transistor operates the bias voltage source so that the emitter-collector voltage of the output-stage transistor of the reference current producing means becomes substantially equal to the emitter-collector voltage of the p-type transistor when the reference current produced in the reference current producing means is mirrored by the current mirror circuit to be supplied as the emitter current of the p-type transistor.

This makes it possible to limit an error of the charge current due to the emitter-collector voltage dependent change of the collector current and thus the base current of the transistor, known as the Early effect, thereby accurately producing the charge current.

Further, a discharge circuit of the present invention, which is a discharge circuit for discharging a capacitor with a base current of an n-type transistor, includes: reference current producing means for producing a reference current for discharging the capacitor; a current mirror circuit which mirrors the reference current so as to draw the reference current as an emitter current of the n-type transistor; and a bias voltage source which produces such a bias voltage that an emitter-collector voltage of an output-stage transistor which supplies the reference current to the current mirror circuit in the reference current producing means becomes substantially equal to an emitter-collector voltage of the n-type transistor.

According to this configuration, the discharge circuit which discharges the capacitor with a small current using the base current of the n-type transistor operates the bias voltage source so that the emitter-collector voltage of the output-stage transistor of the reference current producing means becomes substantially equal to the emitter-collector voltage of the n-type transistor when the reference current produced in the reference current producing means is mirrored by the current mirror circuit to draw the emitter current of the n-type transistor.

This makes it possible to limit an error of the discharge current due to the emitter-collector voltage dependent change of the collector current and thus the base current of the transistor, known as the Early effect, thereby accurately producing the discharge current.

Further, a charge/discharge circuit of the present invention, which is a charge/discharge circuit for charging and/or discharging a capacitor with a base current of a transistor, includes: transistors, provided in parallel and with a quantity that is in accordance with a ratio of charge current to discharge current, for respectively converting a current produced by constant current sources into the base current for charging the capacitor and the base current for discharging the capacitor.

According to this configuration, the transistors which respectively convert the current of the constant current sources into the base current for charging the capacitor and the base current for discharging the capacitor are provided in parallel and with a quantity that is in accordance with the collector current values.

In this way, the same collector current can be flown through each transistor, and an error due to the current amplification rate can be limited. As a result, the charge current and the discharge current can be accurately produced.

Further, a carrier detector circuit of the present invention is adapted to create a carrier detection level using any of the foregoing charge circuit and/or discharge circuit.

According to this configuration, the capacitor is charged or discharged with a small current, i.e., the base current of the transistor, so as to create a carrier detection level that varies with a relatively large time constant. As a result, less capacitance is required for the capacitor of the integrated circuit.

For a fuller understanding of the nature and advantages of the invention, reference should be made to the ensuing detailed description taken in conjunction with the accompanying drawings.

DESCRIPTION OF THE EMBODIMENTS

First Embodiment

Figure 1:
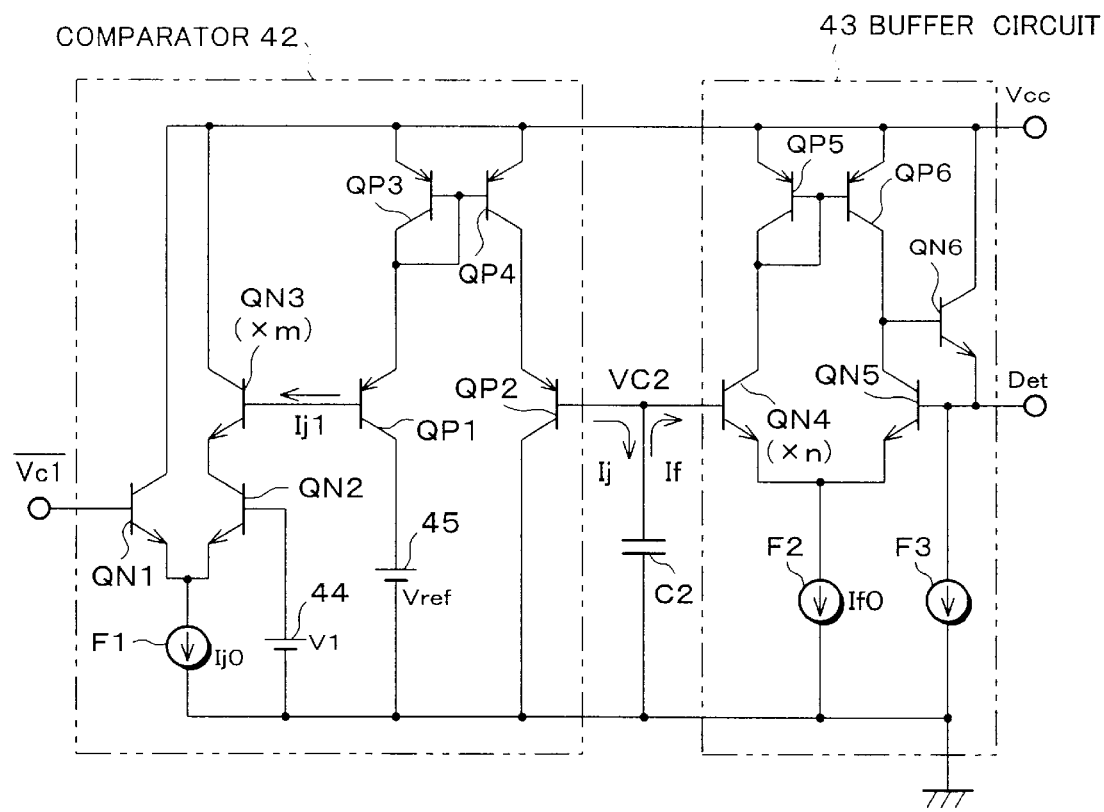
FIG. 1 is an electrical circuit diagram of a charge/discharge circuit of a First Embodiment of the present invention, showing a configuration for a detector circuit of a receiver.

The following will describe one embodiment of the present invention with reference to FIG. 1.

Figure 6:
FIG. 6(a) through FIG. 6(e) are drawings respectively showing waveforms from various parts of the receiver of FIG. 5.
Figure 6:
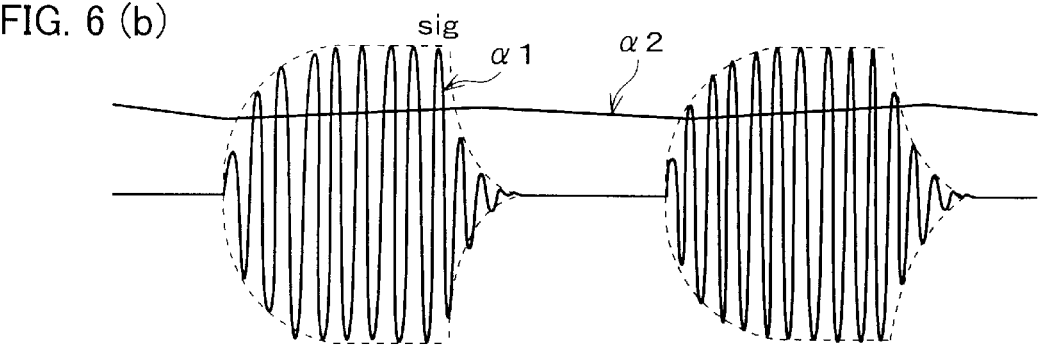
Figure 6:
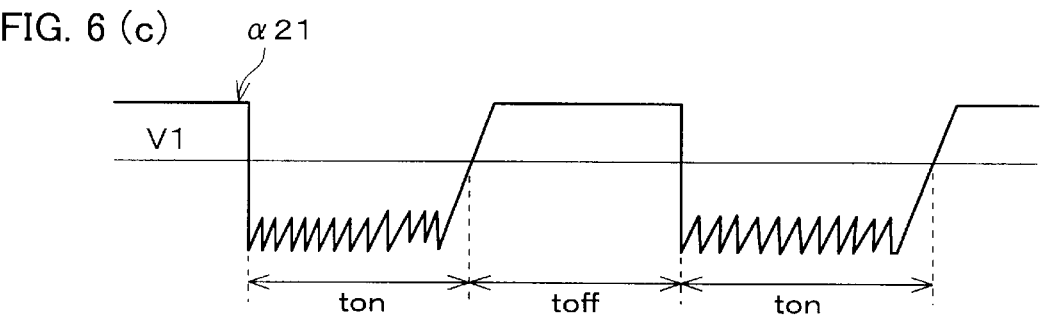
Figure 6:
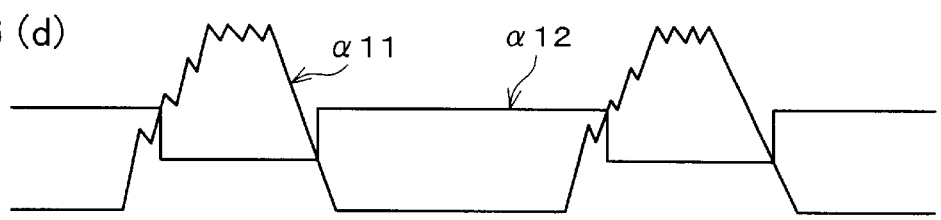
Figure 6:
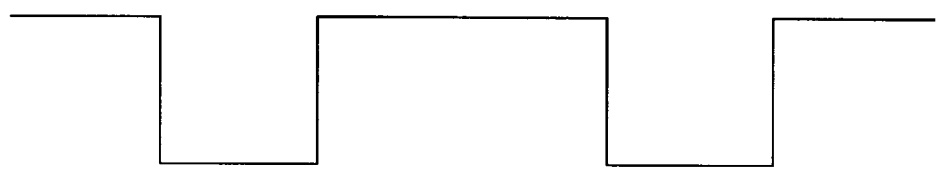
Figure 7:
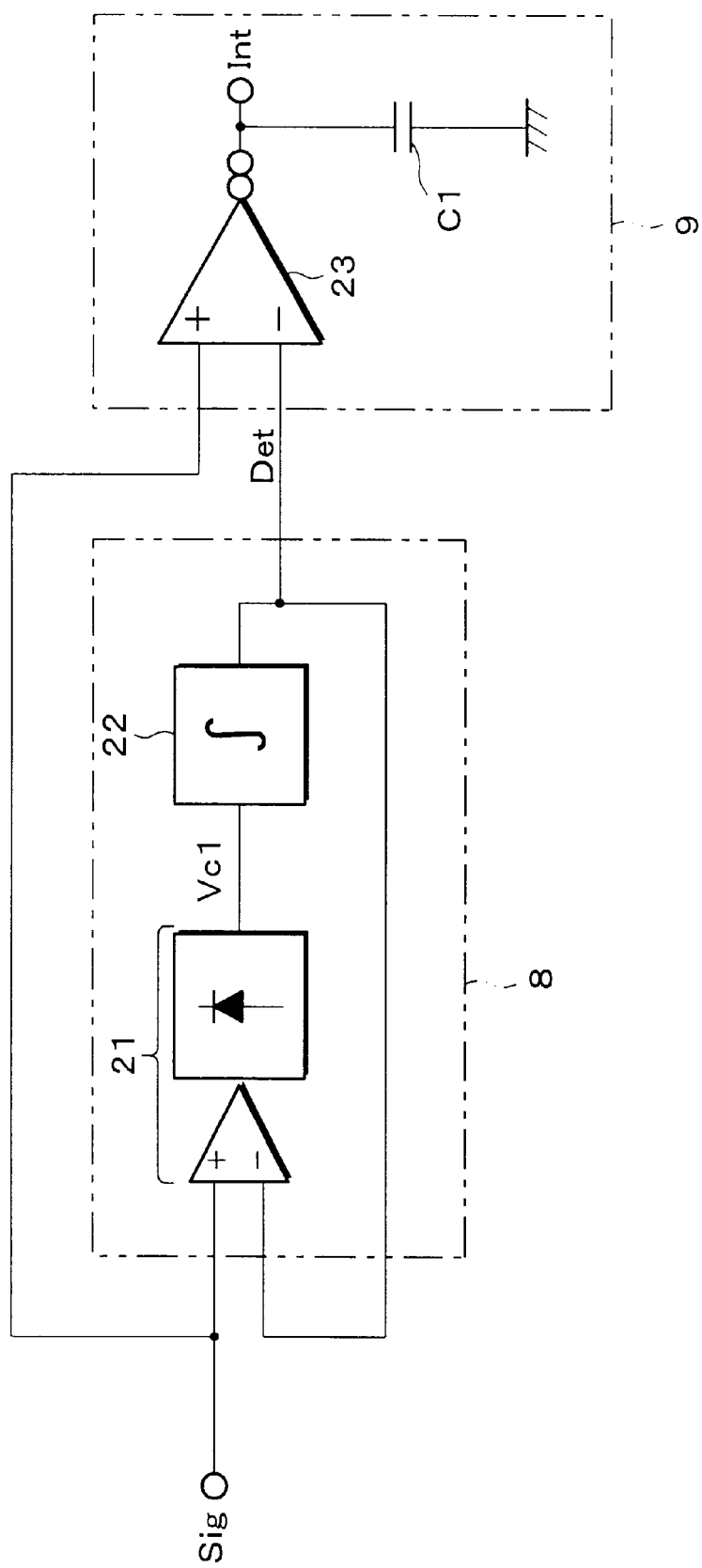
FIG. 7 is an equivalent circuit diagram of a detector circuit and an integrating circuit of the receiver.

FIG. 1 is an electrical circuit diagram of a charge/discharge circuit 41 of the First Embodiment of the present invention. The charge/discharge circuit 41 is realized by a capacitor C2, a comparator 42 of a small output current, and a buffer circuit 43 of a small input current. The configuration of FIG. 1 is adapted so that the comparator 42 receives an inverted output $Vc1^{-1}$ of a detector 21, as shown in FIG. 6(c), instead of directly receiving the output Vc1 of the detector 21.

In the comparator 42, the bases of transistors QN1 and QN2, which make up a transistor differential pair, receive the inverted output $Vc1^{-1}$ and a reference voltage V1 from a reference voltage source 44, respectively. The emitters of the transistors QN1 and QN2 are grounded via a constant current source F1. The collector of the transistor QN1 is connected to a high-level power supply Vcc, and the collector of the transistor QN2 is connected to the high-level power source Vcc via a transistor QN3. The constant current source F1 draws a constant current Ij0 from the emitter of the transistor differential pair QN1 and QN2, so that a current, corresponding to a difference of the inverted output $Vc1^{-1}$ and the reference voltage V1 is drawn from the base of the transistor QN3. The emitter current (reference current) of the transistor QP1 is created based on a base current Ij1 of the transistor QN3. The emitter current of the transistor QP1 is mirrored by transistors QP3 and QP4, which make up a current mirror circuit, to be supplied as the emitter current of a transistor QP2. The transistor QP2 creates a base current based on this emitter current, so as to output the base current as the charge current Ij to the capacitor C2.

In the buffer circuit 43, a biased current, which is a discharge current If from the capacitor C2, is fed to the base of a transistor QN4, which is an input of the buffer circuit 43. The emitter of the transistor QN4, together with the emitter of a transistor QN5 which is paired with the transistor QN4, is grounded via a constant current source F2. The collectors of the transistors QN4 and QN5 are respectively connected to the power supply Vcc via transistors QP5 and QP6 of equal area making up a current mirror circuit. Between the base of the transistor QN5 and the power supply Vcc is interposed a transistor QN6. The base of the transistor QN6 is connected between the collector of the transistor QN5 and the collector of the transistor QP6. The carrier detection level Det is outputted from the base of the transistor QN5 and from the emitter of the transistor QN6. The base of the transistor QN5 is connected to a constant current source F3 for drawing a constant current.

According to this configuration, in the presence of a carrier input, the inverted output $Vc1^{-1}$ of the detector 21 is at low level and the capacitor C2 is charged with the charge current Ij. In the absence of a carrier input, the inverted current $Vc1^{-1}$ is at high level and the capacitor C2 is discharged with the discharge current If. The charge current Ij and the discharge current If, which are small currents, are obtained by utilizing the base currents of the transistors QP2 and QN4, so as to realize a long time constant and therefore a sufficient capacity for the capacitor C2 to be installed in the receiver chip 3.

What is significant in the present embodiment is that a voltage source 45 feeds the collector of the transistor QP1 with a voltage Vref. Here, Vce(QP1) and Vce(QP2), which are collector-emitter voltages of the transistors QP1 and QP2, respectively, are defined as follows.

$$Vce(QP1)=Vcc-Vbe(QP3)-Vref \qquad (8)$$

$$Vce(QP2)=VC2+Vbe(QP2) \qquad (9),$$

where VC2 is the charge voltage of the capacitor C2.

Hence, by setting such Vref that Vce(QP1)≈Vce(QP2), the influence of the Early effect can be alleviated.

The number of parallel transistors making up the transistor QN3 and the number of parallel transistors making up the transistor QN4 are set according to the their respective collector current values. That is, when the number of transistors QN3 and the number of transistors QN4 are m and n, respectively, then $$QN3(m):QN4(n)=Ij0:If0/2 \qquad (10).$$

On the other hand, the number of transistors QN4 and the number of transistors QN5 are the same because the transistor QN4 and the transistor QN5 make up a differential pair.

In this way, the same collector current can be flown through each transistor to reduce error caused by current amplification rate β.

As described, the charge/discharge circuit 41 of the present embodiment, for use in devices such as a receiver for an IR remote controller, creates a carrier detection level Det based on the received signal $VC1^{-1}$ in the carrier detector circuit which detects the presence or absence of a carrier. The charge/discharge circuit 41 operates to amplify the current Ij1, that is produced in the reference current producing means QN1, QN2, QN3, F1, in the p-type transistor QP1. The reference current Ij1 after amplification is mirrored by the current mirror circuit QP3, QP4 to be supplied as the emitter current of the p-type transistor QP2. Here, the bias voltage source 45 operates to substantially equalize the emitter-collector voltage of the p-type transistor QP1 on the output stage of the reference current producing means and the emitter-collector voltage of the p-type transistor QP2. As a result, it is possible to limit an error of the charge current Ij, which is caused by the emitter-collector voltage dependent change of the collector current and thus the base current, known as the Early effect.

Second Embodiment

Figure 2:
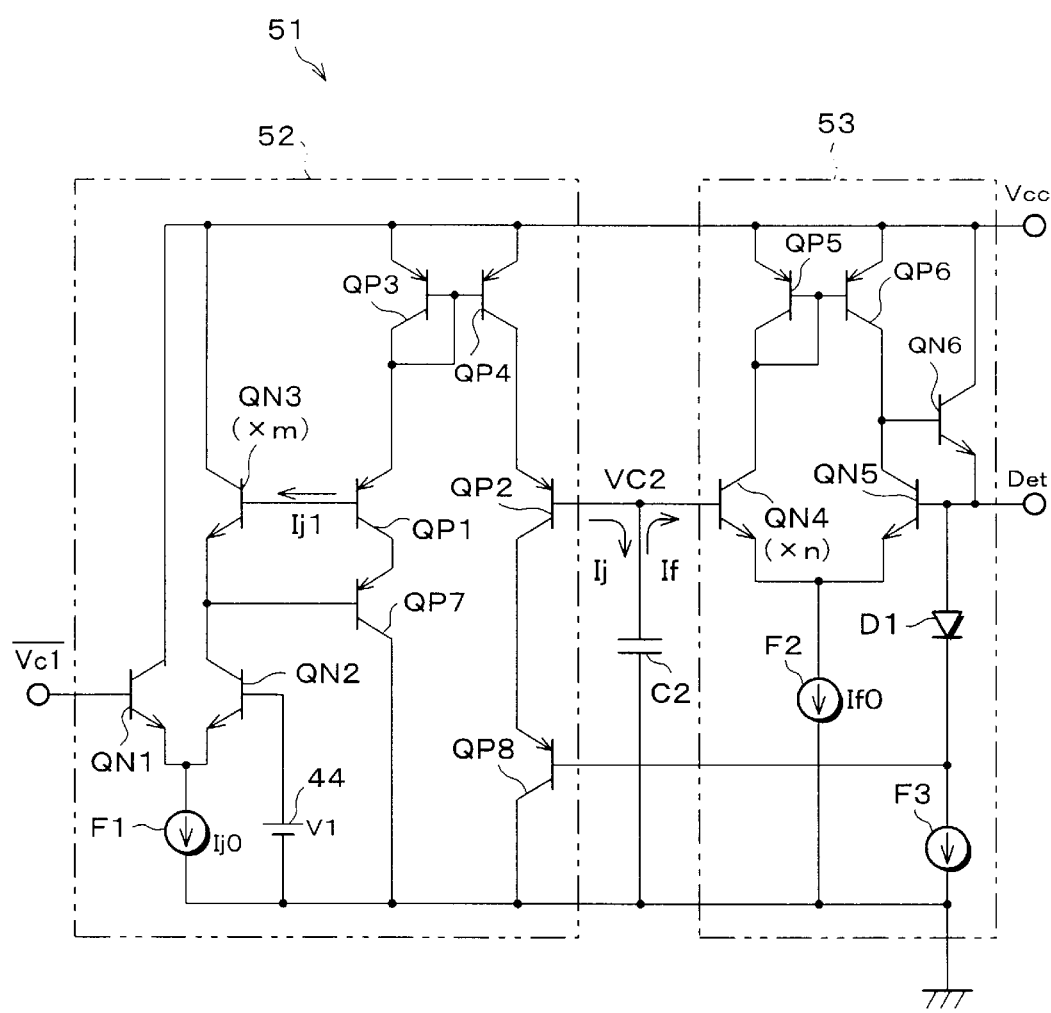
FIG. 2 is an electrical circuit diagram of a charge/discharge circuit of a Second Embodiment of the present invention.

The following will describe another embodiment of the present invention with reference to FIG. 2.

FIG. 2 is an electrical circuit diagram of a charge/discharge circuit 51 of the Second Embodiment of the present invention. The charge/discharge circuit 51 is analogous to the charge/discharge circuit 41 of the First Embodiment, and accordingly corresponding elements are given the same reference numerals and explanations thereof are omitted here. It should be noted in the present embodiment that the collector of the transistor QP1 is grounded via a transistor QP7, instead of the reference voltage source 45, whose emitter is connected to the collector of the transistor QP1, whose collector is grounded, and whose base is connected between transistors QN2 and QN3.

Further, what is significant about the present embodiment is that the collector of the transistor QP2 is grounded via a transistor QP8 whose emitter is connected to the collector of the transistor QP2, whose collector is grounded, and whose base receives, via a diode D1, the carrier detection level Det (substantially equal to the VC2), which is the output of the buffer circuit 53.

According to this configuration, the collector-emitter voltage Vce(QP1) and the collector-emitter voltage Vce(QP2) of the transistors QP1 and QP2 are given by $$
\begin{aligned}
Vce(QP1) = &\ (Vcc - Vbe(QP3)) - \\
&\ (Vcc - Vbe(QP3) - Vbe(QP1) - \\
&\ Vbe(QN3) + Vbe(QP7)) = \\
&\ Vbe \qquad \ldots (11) \\
Vce(QP2) = &\ (VC2 - Vbe(QP2)) - \\
&\ (VC2 (= Det) - VD1 (= Vbe) + \\
&\ Vbe(QP8)) = Vbe \qquad \ldots (12).
\end{aligned}
$$

That is, Vce(QP1)=Vce(QP2), and the influence of the Early effect can be further alleviated. Further, because the collector-emitter voltage Vce(QP1) and the collector-emitter voltage Vce(QP2) are temperature dependent on Vbe, the error caused on current Ij1 and Ij by the temperature dependence can be limited.

Third Embodiment

Figure 3:
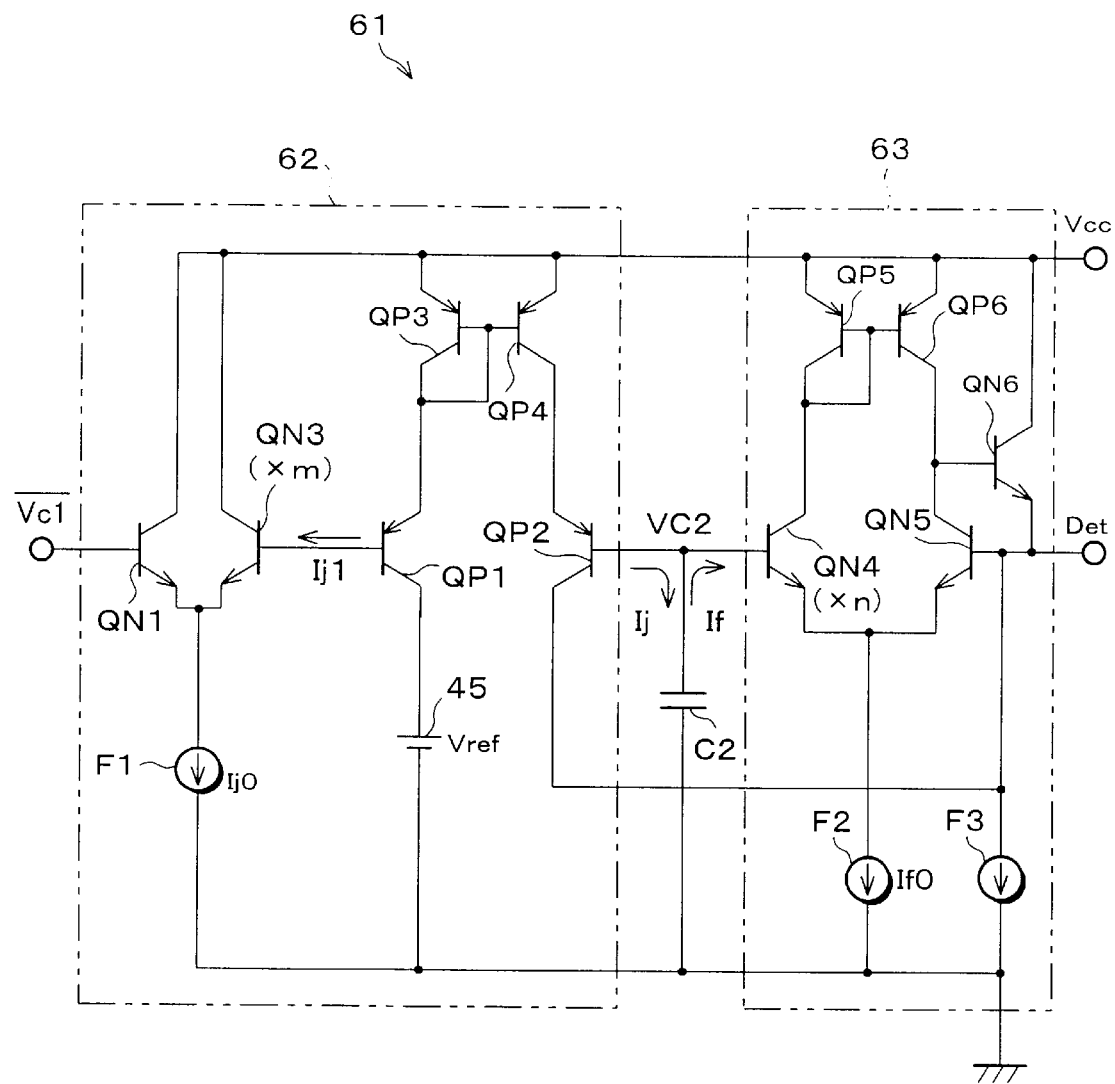
FIG. 3 is an electrical circuit diagram of a charge/discharge circuit of a Third Embodiment of the present invention.

The following will describe yet another embodiment of the present invention with reference to FIG. 3.

FIG. 3 is an electrical circuit diagram of a charge/discharge circuit 61 of the Third Embodiment of the present invention. The charge/discharge circuit 61 is analogous to the charge/discharge circuit 41 of the First Embodiment, and accordingly corresponding elements are given the same reference numerals and explanations thereof are omitted here. It should be noted that a comparator 62 of the present embodiment does not include the transistor QN2 and the reference voltage source 34, but the transistor QN3 and the transistor QN1 make up a differential pair. Further, the collector of the transistor QP2 is connected to the base of the transistor QN5.

According to this configuration, $$Vbe(QP3)+Vbe(QP1)+Vbe(QN3)+Vsat(F1) =3Vbe+Vsat \quad (13).$$

Since the charge/discharge circuit 61 operates under the power voltage Vcc, a voltage of 3V or less, as low as 2.4 (0.7×3+0.3=2.4) V can be attained. With this low voltage, low-voltage operations of recent LSIs, which have been developed to operate under low voltage and low power, can be accommodated.

Figure 8:
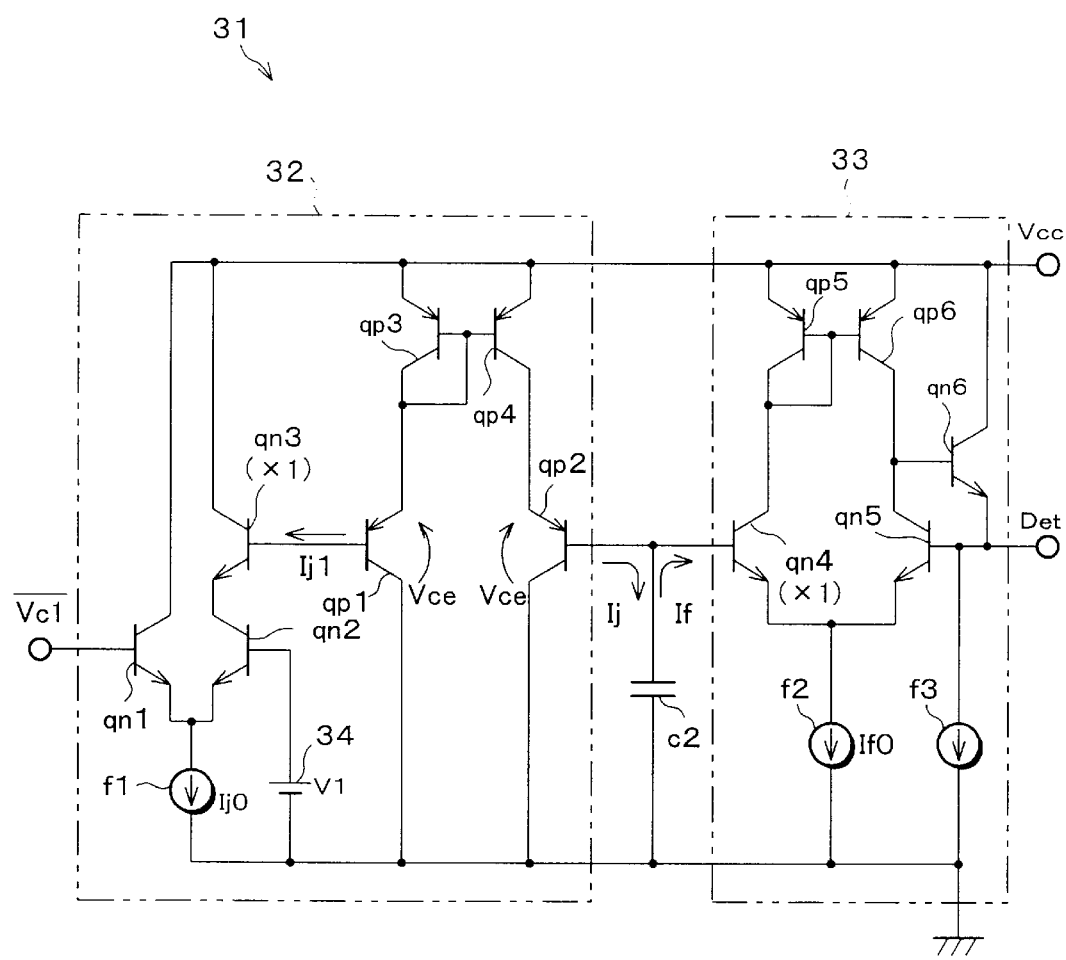
FIG. 8 is an electrical circuit diagram of a typical conventional charge/discharge circuit making up the detector circuit.

This is not the case for the charge/discharge circuit 31 of FIG. 8, which requires a power voltage of 3Vbe(qp3+qp1+qn3)+2Vsat (saturation voltage: qn2(sat)+Ij0(sat)) to ensure the circuit dynamic range for proper operations. Here, since the temperature dependence on Vbe is about −2 mV/° C., when the circuit is used under low temperature conditions of around −30° C. or less, Vbe increases to 0.8 V or higher, which makes it impossible to guarantee operations under low voltage conditions of 3 V or less.

It should be noted here that the foregoing charge/discharge circuits 41, 51, and 61 operate in exactly the same manner but with the opposite charge when the conduction patterns of the transistors and the polarity of the power source are reversed.

Figure 4:
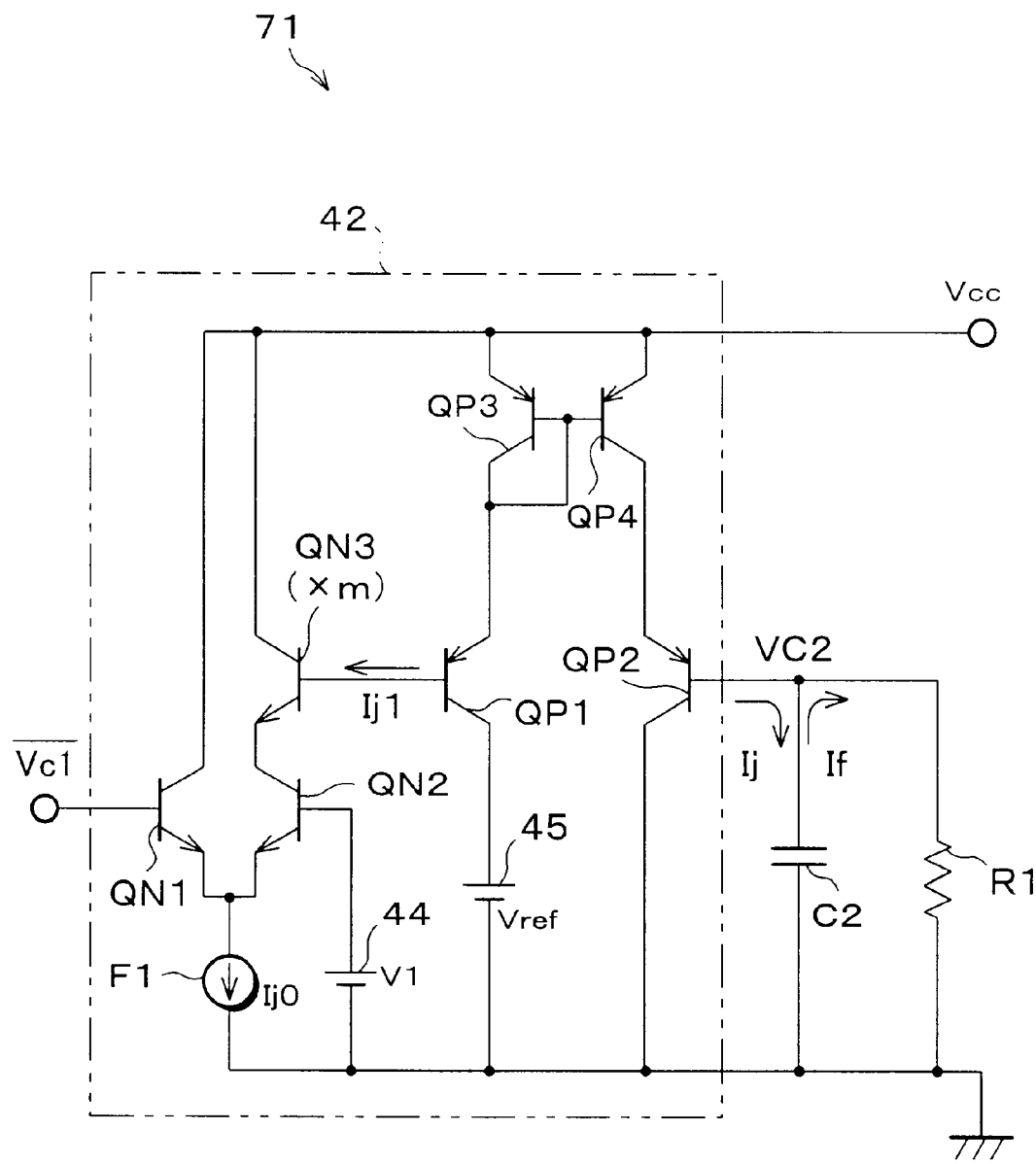
FIG. 4 is an electrical circuit diagram of a charge/discharge circuit of a Fourth Embodiment of the present invention.
Figure 5:
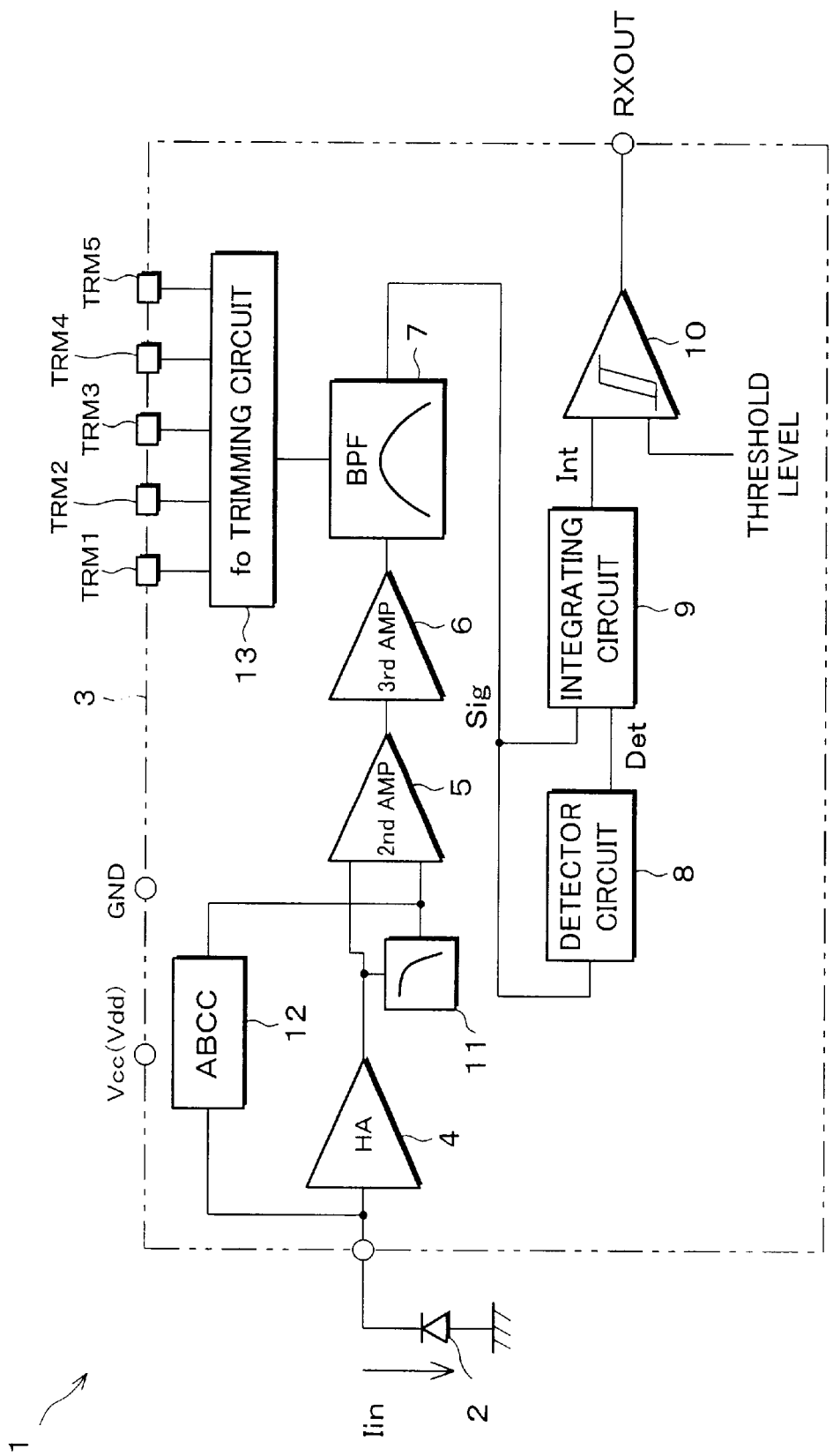
FIG. 5 is a block diagram showing an example of a configuration of a receiver for an IR remote controller

Further, in cases where the output voltage of the buffer circuit is not utilized, as in the case of the buffer circuit 43 in the charge/discharge circuit 41 shown in FIG. 1, the buffer circuit can be replaced with a load resistance that satisfies If=Ij/2. Such a configuration is shown by a charge/discharge circuit 71 in FIG. 4, in which the buffer circuit 43 of the charge/discharge circuit 41 of FIG. 1 is replaced with a load resistance R1 having a discharge current If of the current value Ij/2. In this way, the present invention can be used for charging only. Further, as described above, the conduction patterns of the transistors and the polarity of the power source can be reversed to use the circuit only for the purpose of discharge.

Further, the foregoing descriptions assume that the P-type transistors QP1 through QP8 are lateral PNP transistors, which can be readily fabricated without special processes. However, the lateral PNP transistors may be undesirable under some circumstances because they include a parasitic photodiode at the base terminal, and in photo-sensing devices such as receivers for IR remote controllers, the parasitic photodiode may be undesirably activated by the incident light or other light in the device. It is therefore preferable that the PNP transistor QP2, in particular, which involves the small current, be realized by a vertical PNP transistor.

The present invention is applicable not just to receivers for IR remote controllers, but is also applicable to receivers for communication devices using a carrier, such as IR communication devices or other communication devices employing radio waves.

As described, a charge circuit of the present invention, which is a charge circuit for charging the capacitor with a small current using the base current of the p-type transistor, operates the bias voltage source so that the emitter-collector voltage of the output-stage transistor of the reference current producing means becomes substantially equal to the emitter-collector voltage of the p-type transistor when the reference current produced in the reference current producing means is mirrored by the current mirror circuit to be supplied as the emitter current of the p-type transistor.

This makes it possible to limit an error of the charge current due to the emitter-collector voltage dependent change of the collector current and thus the base current of the transistor, known as the Early effect, thereby accurately producing the charge current.

Further, the charge circuit of the present invention, as described, is adapted to have an arrangement in which the output-stage transistor is a p-type transistor, and the reference current producing means includes: a pair of n-type transistors which makes up a differential pair; a reference current source to which emitters of the pair of n-type transistors are commonly connected; and the output-stage p-type transistor, and a base of one of the n-type transistors receives an input signal, and a base of the other n-type transistor is connected to a base of the output-stage p-type transistor.

According to this arrangement, the reference current producing means, which requires the largest operation voltage in the charge circuit, commonly uses the non-input transistor of the n-type transistors making up the differential pair.

This enables low voltage operations to be realized, for example, with a voltage of around 2.4 V, which is the sum of base-emitter voltages of the transistors of the current mirror circuit, the output-stage p-type transistor, and the n-type transistors making up the differential pair, added to the saturation voltage of the transistor making up the reference current source.

Further, as described, a discharge circuit of the present invention, which is a discharge circuit for discharging the capacitor with a small current using the base current of the n-type transistor, operates the bias voltage source so that the emitter-collector voltage of the output-stage transistor of the reference current producing means becomes substantially equal to the emitter-collector voltage of the n-type transistor when the reference current produced in the reference current producing means is mirrored by the current mirror circuit to be drawn as the emitter current of the n-type transistor.

This makes it possible to limit an error of the discharge current due to the emitter-collector voltage dependent change of the collector current and thus the base current of the transistor, known as the Early effect, thereby accurately producing the discharge current.

Further, as described, a charge/discharge circuit of the present invention, which is a charge/discharge circuit for charging and/or discharging a capacitor with a base current of a transistor, includes: transistors, provided in parallel and with a quantity that is in accordance with a ratio of charge current to discharge current, for respectively converting a current produced by constant current sources into the base current for charging the capacitor and the base current for discharging the capacitor.

In this way, an error due to current amplification rate can be limited. As a result, the charge current and the discharge current can be accurately produced.

Further, as described, a carrier detector circuit of the present invention is adapted to create a carrier detection level using any of the foregoing charge circuit and/or discharge circuit.

According to this configuration, the capacitor is charged or discharged with a small current, i.e., the base current of the transistor, so as to create a carrier detection level that varies with a relatively large time constant. As a result, less capacitance is required for the capacitor of the integrated circuit.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A charge circuit for charging a capacitor with a base current of a p-type transistor, comprising:

reference current producing means for producing a reference current for charging the capacitor;

a current mirror circuit which mirrors the reference current so as to supply the reference current as an emitter current of the p-type transistor; and a bias voltage source which produces such a bias voltage that an emitter-collector voltage of an output-stage transistor which draws the reference current from the current mirror circuit in the reference current producing means becomes substantially equal to an emitter-collector voltage of the p-type transistor.

2. The charge circuit as set forth in claim 1, wherein:

the output-stage transistor is a p-type transistor, and said reference current producing means comprises: a pair of n-type transistors which makes up a differential pair; a reference current source to which emitters of the pair of n-type transistors are commonly connected; and the output-stage p-type transistor, and a base of one of the n-type transistors receives an input signal, and a base of the other n-type transistor is connected to a base of the output-stage p-type transistor.

3. A discharge circuit for discharging a capacitor with a base current of an n-type transistor, comprising:

reference current producing means for producing a reference current for discharging the capacitor;

a current mirror circuit which mirrors the reference current so as to draw the reference current as an emitter current of the n-type transistor; and a bias voltage source which produces such a bias voltage that an emitter-collector voltage of an output-stage transistor which supplies the reference current to the current mirror circuit in the reference current producing means becomes substantially equal to an emitter-collector voltage of the n-type transistor.

4. A charge/discharge circuit for charging and/or discharging a capacitor with a base current of a transistor, comprising:

transistors, provided in parallel and with a quantity that is in accordance with a ratio of charge current to discharge current, for respectively converting a current produced by constant current sources into the base current for charging the capacitor and the base current for discharging the capacitor.

5. A carrier detector circuit for creating a carrier detection level using a charge circuit which charges a capacitor with a base current of a p-type transistor, wherein:

said charge circuit comprises:

reference current producing means for producing a reference current for charging the capacitor;

a current mirror circuit which mirrors the reference current so as to supply the reference current as an emitter current of the p-type transistor; and a bias voltage source which produces such a bias voltage that an emitter-collector voltage of an output-stage transistor which draws the reference current from the current mirror circuit in the reference current producing means becomes substantially equal to an emitter-collector voltage of the p-type transistor.

6. The carrier detector circuit as set forth in claim 5, wherein:

the output-stage transistor is a p-type transistor, and said reference current producing means comprises: a pair of n-type transistors which makes up a differential pair; a reference current source to which emitters of the pair of n-type transistors are commonly connected; and the output-stage p-type transistor, and a base of one of the n-type transistors receives an input signal, and a base of the other n-type transistor is connected to a base of the output-stage p-type transistor.

7. A carrier detector circuit for creating a carrier detection level using a discharge circuit which discharges a capacitor with a base current of an n-type transistor, wherein:

said discharge circuit comprises:

reference current producing means for producing a reference current for discharging the capacitor;

a current mirror circuit which mirrors the reference current so as to supply the reference current as an emitter current of the n-type transistor; and a bias voltage source which produces such a bias voltage that an emitter-collector voltage of an output-stage transistor which supplies the reference current to the current mirror circuit in the reference current producing means becomes substantially equal to an emitter-collector voltage of the n-type transistor.

8. A carrier detector circuit for creating a carrier detection level using a charge/discharge circuit which charges and/or discharges a capacitor with a base current of a transistor, wherein:

said charge/discharge circuit comprises:

transistors, provided in parallel and with a quantity that is in accordance with a ratio of charge current to discharge current, for respectively converting a current produced by constant current sources into the base current for charging the capacitor and the base current for discharging the capacitor.

* * * * *